Nov. 29, 1960 A. JASIK 2,961,661
PLEATED GLOVES AND METHODS OF AND APPARATUS FOR MAKING THE SAME
Filed Feb. 13, 1959 6 Sheets-Sheet 3
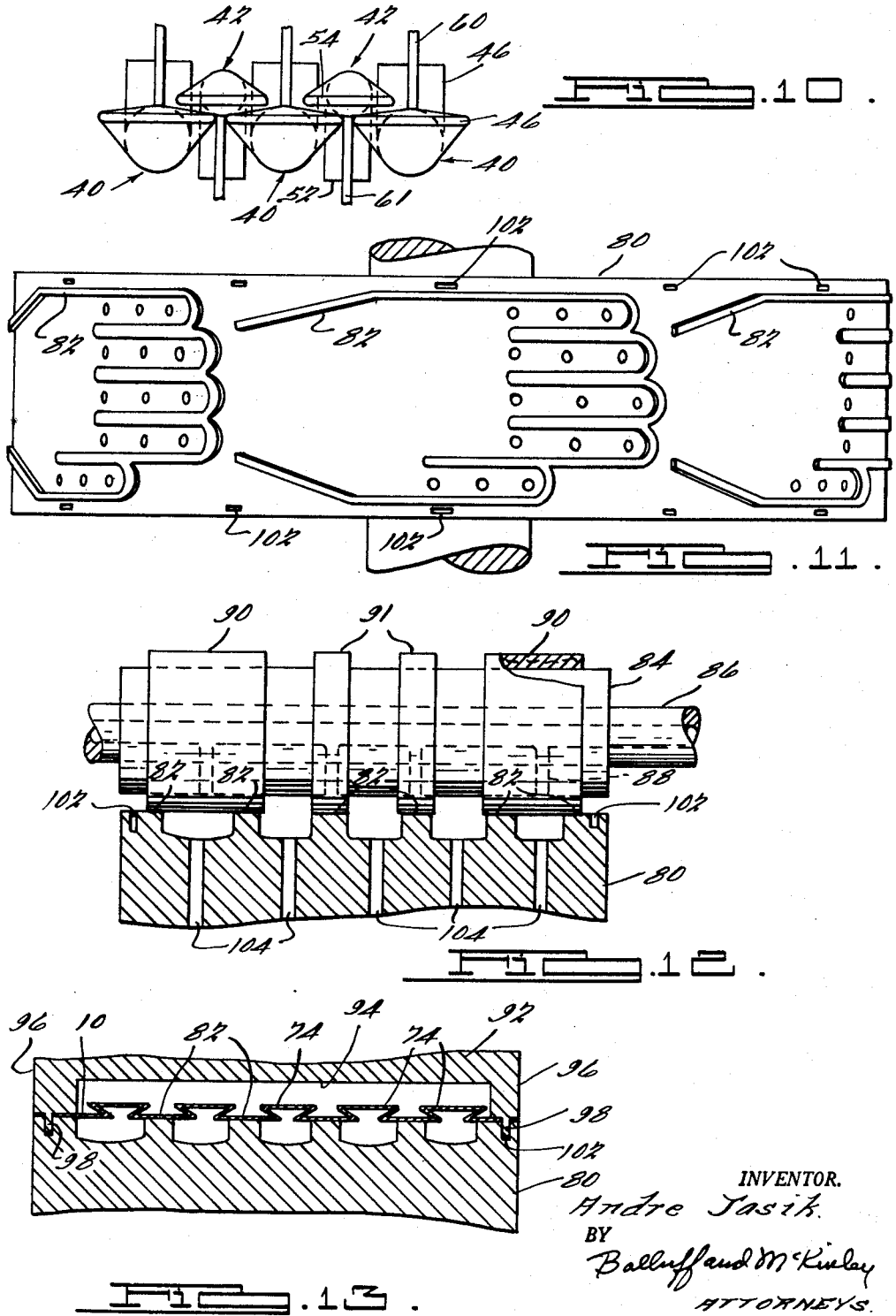
INVENTOR.
Andre Jasik
BY
Balluff and McKinley
ATTORNEYS.

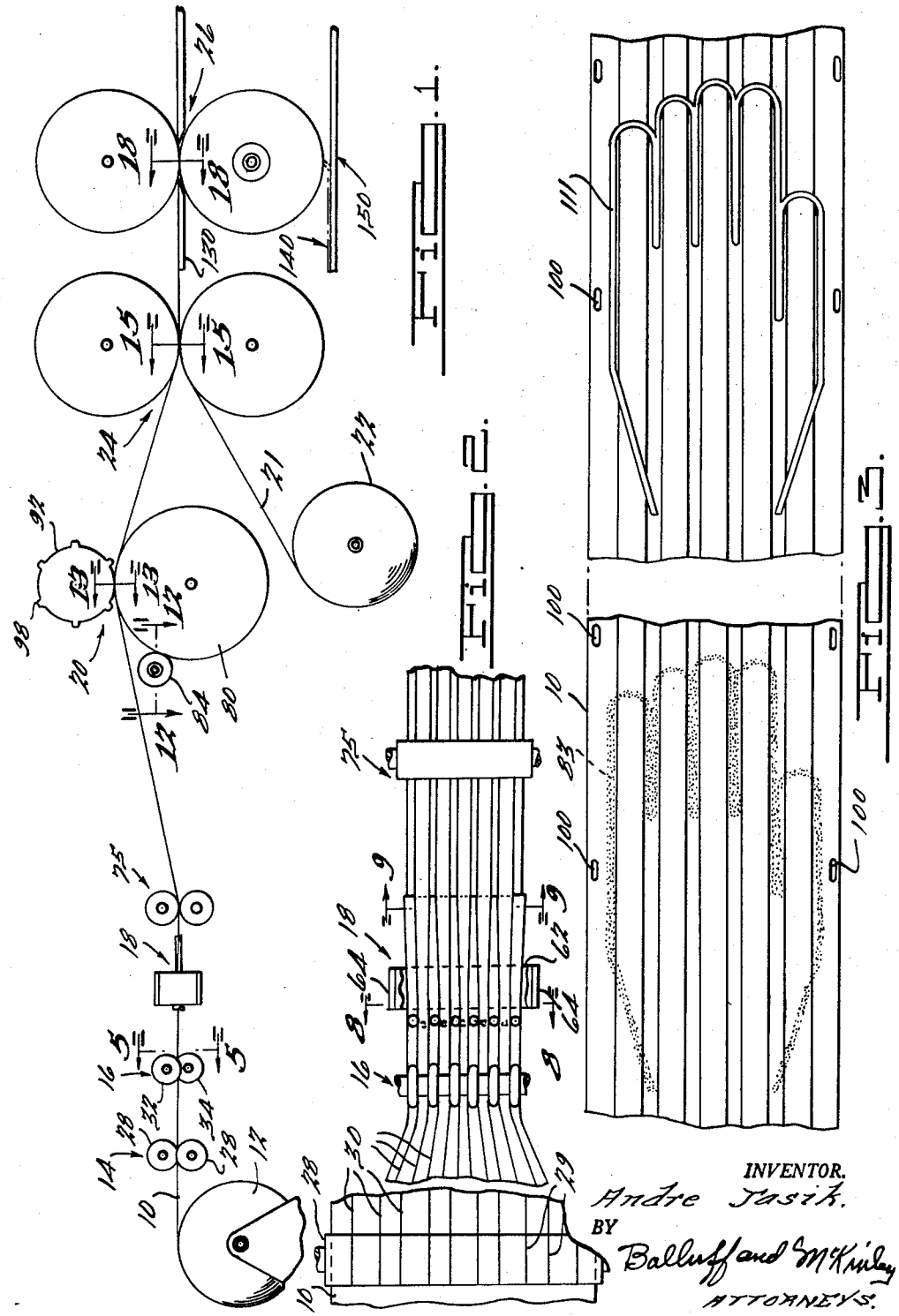

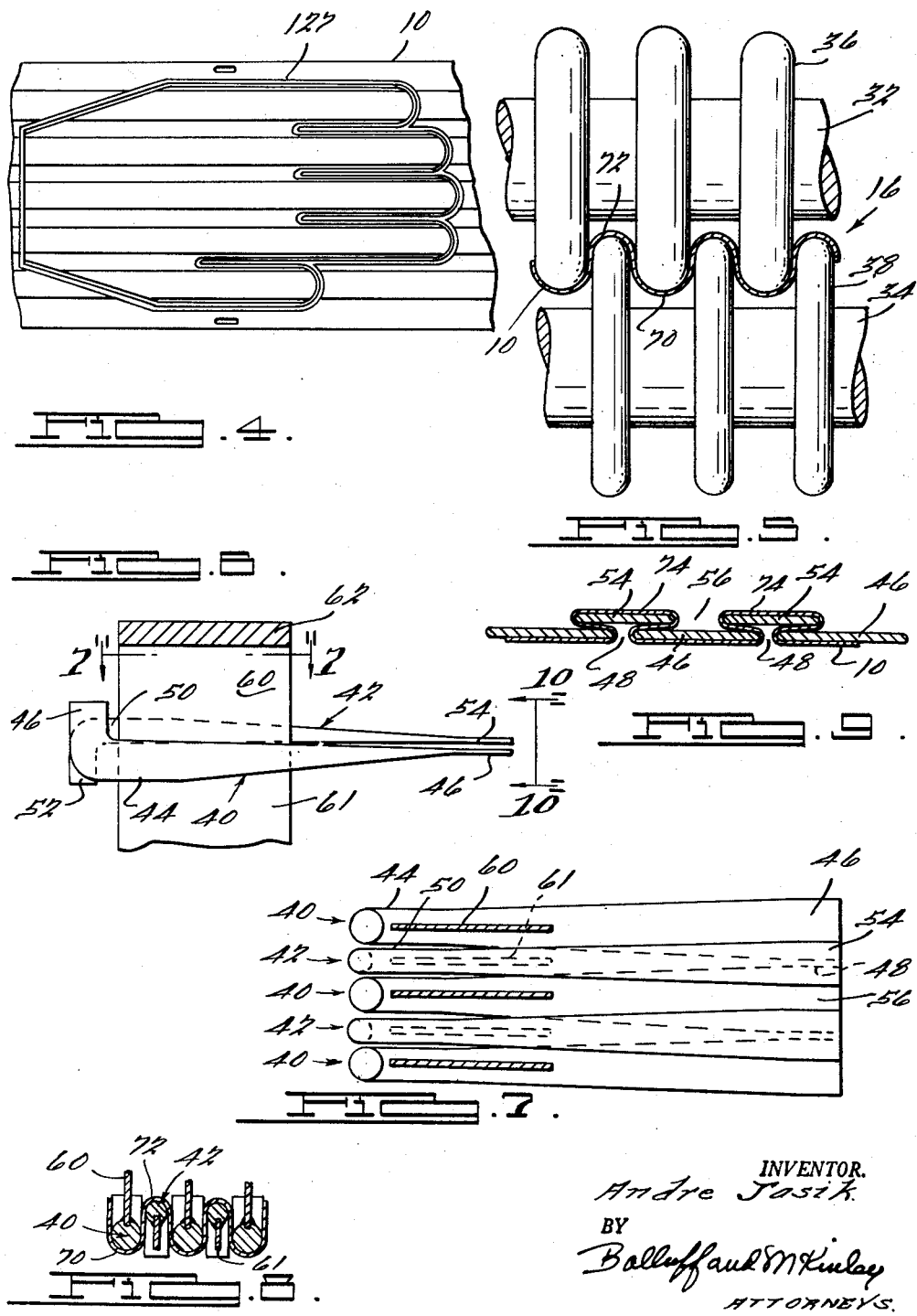

Nov. 29, 1960 A. JASIK 2,961,661
PLEATED GLOVES AND METHODS OF AND APPARATUS FOR MAKING THE SAME
Filed Feb. 13, 1959 6 Sheets-Sheet 4

INVENTOR.
Andre Jasik
BY
Balluff and McKinley
ATTORNEYS.

Nov. 29, 1960  A. JASIK  2,961,661
PLEATED GLOVES AND METHODS OF AND APPARATUS FOR MAKING THE SAME
Filed Feb. 13, 1959  6 Sheets-Sheet 5

INVENTOR.
Andre Jasik
BY
Balluff and McKinley
ATTORNEYS.

Nov. 29, 1960 A. JASIK 2,961,661
PLEATED GLOVES AND METHODS OF AND APPARATUS FOR MAKING THE SAME
Filed Feb. 13, 1959 6 Sheets-Sheet 6
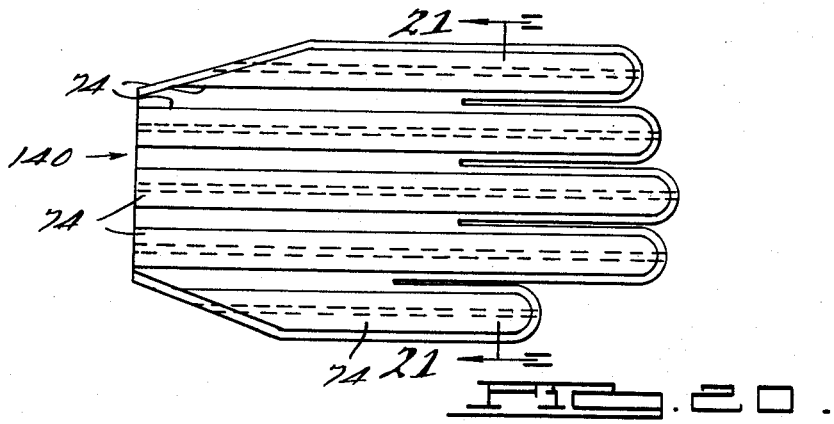
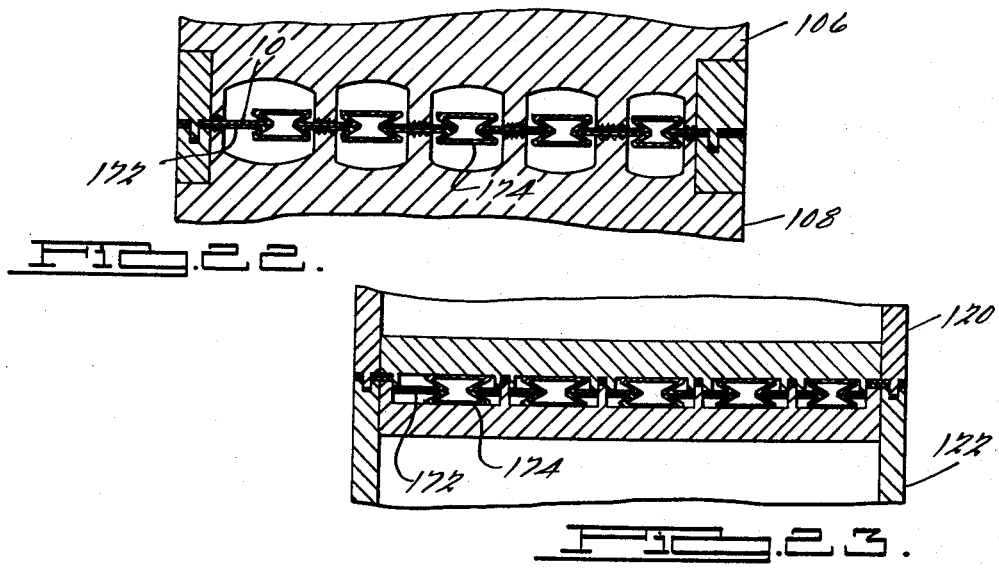
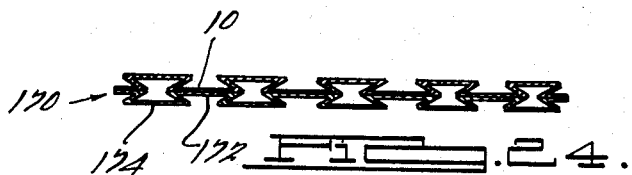
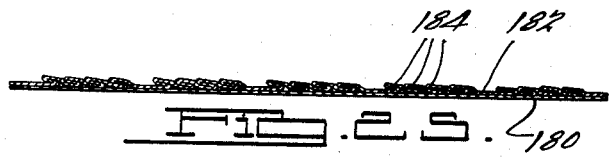
INVENTOR.
Andre Jasik
BY
Balluff and McKinley
ATTORNEYS.

United States Patent Office 2,961,661
Patented Nov. 29, 1960

2,961,661

PLEATED GLOVES AND METHODS OF AND APPARATUS FOR MAKING THE SAME

Andre Jasik, 314 E. Woodward Heights, Hazel Park, Mich.

Filed Feb. 13, 1959, Ser. No. 792,995

13 Claims. (Cl. 2—169)

This invention relates to gloves and to methods of and apparatus for making gloves, and has particular reference to the manufacture of low-cost disposable paper or cloth gloves.

In general, it is the object of this invention to provide an inexpensive glove made of suitable paper or fabric material and adapted for many uses which are not practicable or economically feasible with gloves now available on the market. The essential feature of my invention is that I have provided a means by which gloves of paper, cloth or other material may be mass produced at such very low cost that the gloves may be used and then discarded even after only a single use without undue expense to the user. The gloves forming the subject matter of this invention are particularly suited for use in factories or plants, in those instances where a worker must handle blueprints or other articles without soiling them, and for use by factory workers and others at lunch time. The gloves are also adapted for use as disposable items in drive-in restaurants or in other instances where food is to be eaten with the fingers. Gloves of this type are also adapted for numerous household uses and for use by mechanics or car owners when changing tires or doing other work when it is desired to keep the hands clean. The foregoing are merely illustrative of the many uses to which low-cost disposable gloves of the type described herein may be put.

Gloves may be made according to my invention from any suitable paper or fabric depending upon the intended use of the gloves. A further feature of my invention is that, due to the unique construction of the gloves, it is not necessary to manufacture the gloves in all sizes. This is due to the pleated construction of the back of the glove or both the back and the palm of the glove. If only the back of the glove is pleated, as in one illustrated embodiment of the invention, it will be necessary to make right and left-hand gloves, but where both the back and the palm of the glove are pleated, then the gloves may be used on either right or left hand. The pleated construction is such that the gloves will snugly fit nearly any size hand, thus eliminating the necessity for producing gloves in many different sizes as is now customary. Specially treated gloves of either cloth or paper may also be produced in accordance with this invention. For example, the material from which the gloves are made may be water-proofed or made resistant to other liquids or chemicals and then processed in accordance with my invention. While the production of disposable gloves is a primary objective, it will be apparent that gloves made in accordance with this invention, when made of suitable material, will be suitable for use as work gloves of various types having a useful life comparable with those now available.

The principal object of the invention is therefore to provide a very inexpensive glove capable of being produced by mass production methods, thereby to provide gloves which may be discarded after a single use without undue expense to the user.

A further object of the invention is to provide a glove of novel construction.

Another object of the invention is to provide a new and improved method of manufacturing gloves.

A further object of the invention is to provide a new and improved apparatus for the mass production of gloves.

Another object of the invention is to provide a novel means for producing pleats in cloth or paper strip stock.

Other and further objects of the invention will be apparent from the following description and claims and may be understood by reference to the accompanying drawings, of which there are six sheets, which by way of illustration show preferred embodiments of the invention and what I now consider to be the best mode of applying the principles thereof. Other embodiments of the invention may be used without departing from the scope of the present invention as set forth in the appended claims.

Fig. 1 is a schematic view illustrating an apparatus for practicing the present invention;

Fig. 2 is a fragmentary top plan view of a portion of the apparatus shown in Fig. 1;

Fig. 3 is an enlarged fragmentary top plan view illustrating successive steps of the process of manufacturing gloves;

Fig. 4 is a view similar to Fig. 3 illustrating a further step in the manufacture of the gloves;

Fig. 5 is an enlarged fragmentary sectional view taken on line 5—5 of Fig. 1;

Fig. 6 is a side elevational view illustrating the pleating rods forming a part of the apparatus;

Fig. 7 is a fragmentary sectional view taken on line 7—7 of Fig. 6;

Fig. 8 is a fragmentary sectional view taken on line 8—8 of Fig. 2;

Fig. 9 is an enlarged fragmentary sectional view taken on line 9—9 of Fig. 2;

Fig. 10 is an enlarged end elevational view of the pleating rods taken on line 10—10 of Fig. 6;

Fig. 11 is a top plan view of the gluing roll forming a part of the apparatus;

Fig. 12 is an enlarged sectional view taken on line 12—12 of Fig. 1;

Fig. 13 is an enlarged sectional view taken on line 13—13 of Fig. 1;

Fig. 20 illustrates a glove manufactured according to the present invention;

Fig. 22 is a view similar to Fig. 15 illustrating one step in the manufacture of a modified form of glove having pleated palm and back sections;

Fig. 23 is a view similar to Fig. 18 and illustrating the blanking operation performed on the modified type of glove;

Fig. 24 is a sectional view through a glove having pleated palm and back sections; and Fig. 25 is a sectional view of a further modified form of glove illustrating a different type of pleating.

Figure 14:
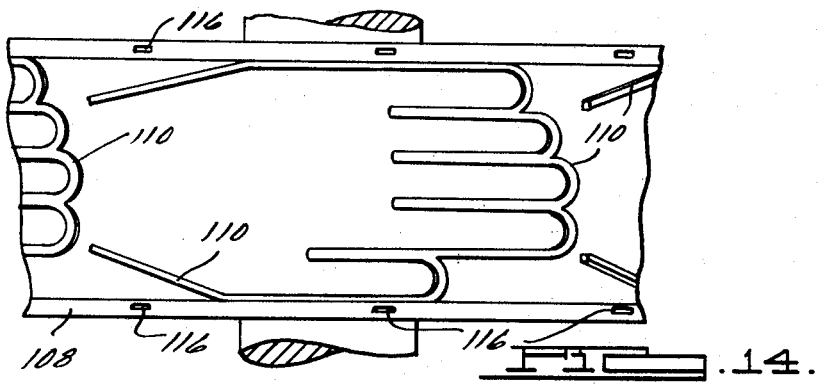
Fig. 14 is a top plan view of one of the pressing rolls employed in the invention.

One form of machine for making gloves in accordance with the present invention is illustrated schematically in Fig. 1, which illustrates the production of gloves having pleated backs, the palms of the gloves not being pleated. The elongated strip 10 of paper or cloth stock from which the pleated backs of the gloves are made is supplied from a roll 12. The stock may be any paper or cloth material suitable for use in practicing the invention, and may be treated in any desired manner to make the same water-proof, grease-proof or resistant to other liquids or chemicals as desired. As the stock is fed through the apparatus, it is subjected to a series of operations which may include a creasing operation indicated at 14, a folding operation indicated at 16, a pleating step shown at 18, and a gluing operation indicated at 20. A second strip 21 of paper or cloth, from which the palms of the gloves are made, is unwound from a roll 22 and is glued to the strip 10 at the pressing station 24. The two strips 10 and 21 are then subjected to a blanking operation indicated at 26 for severing a completed glove from the joined strips of stock.

At the creasing station 14, the strip 10 is passed between a pair of creasing rolls 28 having circumferentially extending creasing formations 29 thereon for creasing the strip 10 longitudinally thereof along lines indicated at 30 in Fig. 2. The crease lines 30 conform generally to the lines along which the stock will later be folded and pleated as it proceeds through the machine, and the crease lines will facilitate the folding and pleating operations. The creasing rolls 28 will be particularly useful with certain type of stock which may be relatively difficult to process, such as relatively stiff paper. The creasing rolls may not be necessary with other types of stock, such as thin fabrics or paper.

After passing through the creasing rolls the strip of stock passes between upper and lower folding rolls 32 and 34, which are more fully illustrated in Fig. 5. The upper folding roll 32 is provided with spaced annular discs 36 meshed with similar discs 38 on the roll 34 and between which the strip 10 is passed so as to be folded or corrugated in the manner shown in Fig. 5. Between the creasing rolls 28 and the folding rolls, the strip 10 assumes the narrower width made necessary by the folding operation.

The strip 10 then passes to the pleating station 18, which is more fully illustrated in Figs. 6 to 10, inclusive. The pleating device comprises a first series of generally horizontally extending pleating rods 40 and a second series of pleating rods 42, each of the latter being disposed between a pair of the rods 40. Each of the rods 40 has a generally circular leading end 44 bent upwardly at 46 as shown in Fig. 6. The rods 40 are tapered from their circular leading ends 44 to a relatively thin flat trailing end 46. As shown in Fig. 7, the rods 40 flare or taper outwardly in a horizontal plane toward the trailing ends 46. The spacing of the rods 40 and the outward taper imparted thereto is such that a narrow slot 48 is defined between each two adjacent rods 40 at their trailing ends 46.

The rods 42 are similar to the rods 40, except that they are somewhat smaller in diameter at their leading ends 50 and are bent downwardly as at 52 at the forward ends thereof. The rods 42 are also tapered in a vertical plane down to flat trailing ends 54 and are also flared outwardly in a horizontal direction to define a space 56 between the trailing ends of adjacent pairs of the rods 42. Each of the rods 40 has secured thereto an upwardly projecting supporting plate 60, while downwardly extending support plates 61 are secured to rods 42. The plates 60 and 61 are secured to upper and lower cross supports 62 which extend transversely across the rods above and below the same. The cross supports 62 are secured at their opposite ends to supporting frame members 64 disposed on opposite sides of the strip being processed.

The pleating rods are adapted to form longitudinally extending pleats in the stock as the same is fed through the pleating device. Referring again to Fig. 5, it will be seen that the folding rolls 32 and 34 fold the material into a series of loops or corrugations. The upper roll 32 forms the material into a series of upwardly opening folds 70 of slightly larger diameter than the oppositely disposed folds 72 formed by the lower roll 34. The folds 70 are received by the leading ends 44 of the larger diameter rods 40, while the alternate folds 72 are received on the leading ends 50 of the smaller diameter rods 42, as shown in Fig. 8. As the material is fed along the rods 40 and 42, it is formed into the pleats shown in Fig. 9 since the lateral taper of the pleating rods causes the trailing ends of the rods 42 to overlap the trailing ends of two adjacent rods 40. As shown in Figs. 6 and 10, the trailing ends 54 of the rods 42 are spaced slightly above the trailing ends of the rods 40. The material progressing through the pleating machine therefore is gradually formed from the longitudinal folds shown in Fig. 5 into the pleats 74 shown in Fig. 9.

After leaving the pleating device 18, the material may be passed through a pair of ironing rolls 75 if desired, although it will not be necessary to use the ironing rolls with all types of material. The use of the ironing rolls is preferred but may be dispensed with if desired.

After being pleated and ironed, the material is next moved through the glue applying station indicated at 20 in Fig. 1 and illustrated more clearly in Figs. 11, 12 and 13. The gluing apparatus includes a lower roll 80 having on its periphery a series of patterns conforming generally to the outline of the gloves to be formed. The glove patterns may be formed by raised portions or ribs 82 projecting from the periphery of the roll 80. The number of glove patterns formed around the periphery of the roll may be varied as desired and will, of course, depend upon the diameter of the roll. The raised portions or ridges 82 are adapted to apply glue to the underside of the strip 10 along the side edges of the glove to be formed and between the fingers of the glove. The shaded pattern indicated at 83 at the left-hand side of Fig. 3 illustrates the pattern on which glue is applied to the underside of the strip by the applicating roll 80.

The raised portions 82 of the roll 80 are supplied with glue from a smaller roll 84 which is mounted on a hollow shaft 86, the interior of which is supplied with glue or other suitable adhesive material in liquid form from a supply tank. The glue is fed from the interior of the shaft 86 through radial openings 88 which extend through the shaft 86 and the roll 84. The glue is fed through the radial openings 88 to annular strips of felt or other suitable fabric material which is secured on the roll 84. The fabric material may include two wider sections 90 at the ends of the roll adapted to supply glue onto those portions of the ribs 82 corresponding to the side edges of the glove and the spaces on opposite sides of the thumb and little finger. Two narrower strips 91 are adapted to supply glue onto those portions of the ribs 82 corresponding to the spaces on opposite sides of the middle finger of the glove.

The gluing roll 80 is thus continually supplied with glue upon rotation thereof and transfers the glue onto the underside of the strip 10 as the strip is passed between the roll 80 and the upper roll 92. The roll 92 has a circumferentially extending recess 94, as shown in Fig. 13, so that only the end portions 96 of the roll 92 engage the stock as it passes between the gluing rolls. The roll 92 is provided with a series of projections or punches 98 at both ends thereof for perforating the side edges of the strip stock as it passes between the gluing rolls. The perforations 100 formed in the stock by the punches 98 which align with recesses 102 in the roll 80 are for the purpose of properly locating the strip during subsequent steps in the process of manufacture. The roll 80 is provided with a series of radially extending passages 104 through which excess glue may be drained.

Figure 15:
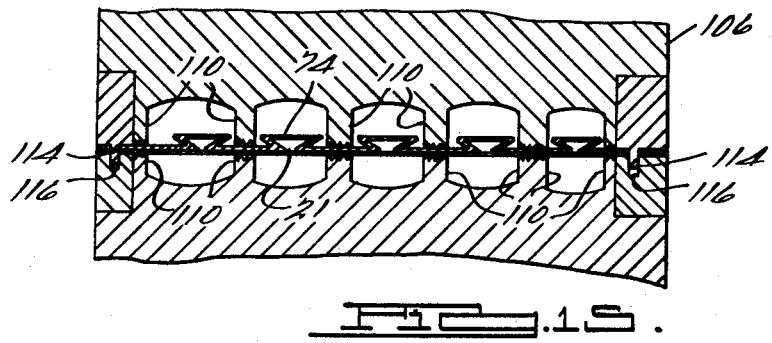
Fig. 15 is an enlarged fragmentary sectional view taken on line 15—15 of Fig. 1.

After passing through the gluing rolls 80 and 92, the stock is then fed to the pressing station 24, which includes upper and lower pressing rolls 106 and 108, respectively, more fully illustrated in Figs. 14 and 15. As shown in Fig. 1, the stock 21 from which the palms of the gloves will be made is fed from roll 22 and is also passed between the pressing rolls 106 and 108 so as to be glued to the underside of the strip 10. Each roll 106 and 108 is provided on its periphery with a series of ribs 110 conforming to the outline of the glove to be formed and generally corresponding to the outline of the corresponding formations 82 on the roll 80 by means of which glue is applied to the strip 10, although the ribs 110 may be slightly narrower than ribs 82. The outer surfaces of ribs 110 are preferably knurled to provide a secure bond between the two strips of stock along the glued portions. The pattern indicated at 111 in Fig. 3 illustrates the areas in which the strips 10 and 21 are pressed together.

The upper pressing roll 106 is provided at each end thereof with a series of locating projections 114 receivable within corresponding slots 116 formed in opposite ends of the lower roll 108. The projections 114 pass through the apertures 100 punched out in the strip 10 during the gluing operation, as described, and insure that the strip will be located between the rolls so that the ribbed portions 110 thereof will accurately align with the glued portions of the stock. The projections 114 will also perforate the palm stock 21 in alignment with the perforations 100 in the stock 10 so that in subsequent operations the two strips of stock will be accurately located.

Instead of being glued in the manner described, one of the strips may be suitably impregnated and then heat sealed to the other strip by passing the strips between heated rolls similar to the rolls 106 and 108.

Figure 16:
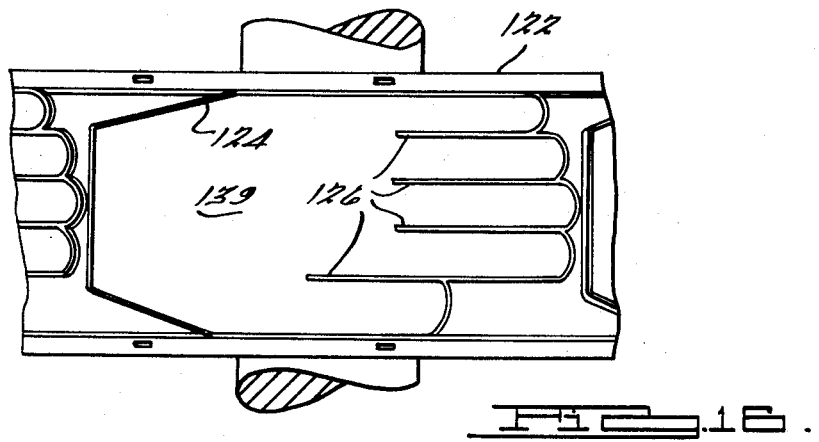
Fig. 16 is a plan view of the lower cutting roll illustrated in Fig. 1.
Figure 17:
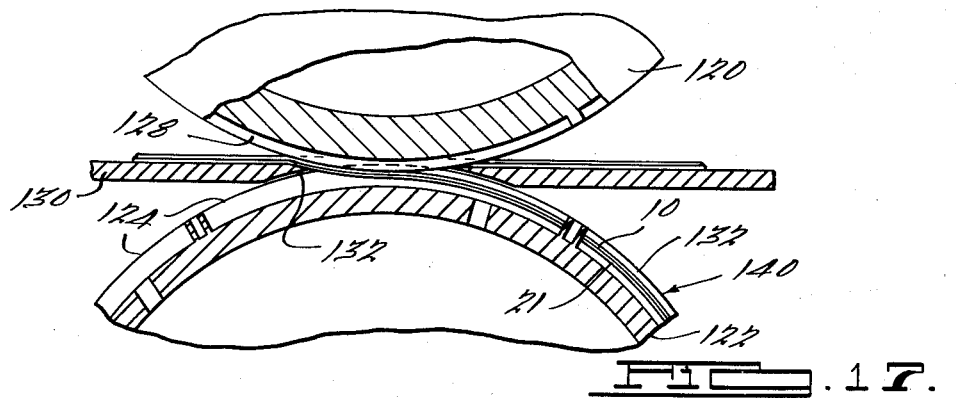
Fig. 17 is an enlarged fragmentary vertical sectional view through the cutting rolls.
Figure 18:
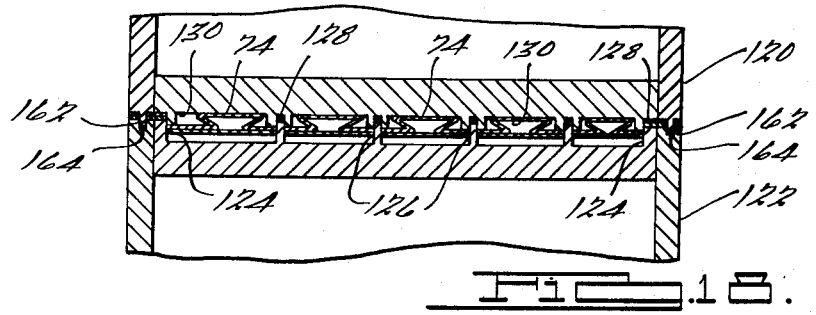
Fig. 18 is an enlarged fragmentary sectional view taken on line 18—18 of Fig. 1.

The operations thus far described will provide two strips of paper or other stock arranged in face-to-face relation and glued together along an outline or pattern corresponding to the glove to be made. The two strips are then moved to the blanking operation 26 which includes upper and lower cutting rolls 120 and 122, illustrated in Figs. 16 to 19, inclusive. Upon leaving the pressing rolls the stock is fed onto a table 130 having an opening 132 therein through which the upper and lower blanking rolls 120 and 122 may operate to blank out a completed glove from the stock. Fig. 16 is a plan view of the lower blanking roll 122 from which it will be seen that this roll is provided around its circumference with a series of thin cutting ribs 124 each of which corresponds to the outline of a glove and includes portions 126 arranged to sever the stock between the fingers of the glove. The upper roll 120 is provided with recesses 128 corresponding to the cutting ribs 124 and 126 so that as the stock passes between the rolls it will be severed to blank out the gloves. The stock is severed along the pattern indicated at 127 in Fig. 4. The roll 120 is also provided with recesses 130 adapted to receive the pleats 74 formed in the backs of the gloves. As the stock is severed by the blanking rolls 120 and 122, the completed glove, designated 140, will be pushed down by the roll 120 into one of the areas 139 bounded by a cutting rib 124 so as to be carried around by the lower roll 122 until ejected onto a suitable table or conveyor 150 from which the completed gloves are moved to a packaging station.

Figure 19:
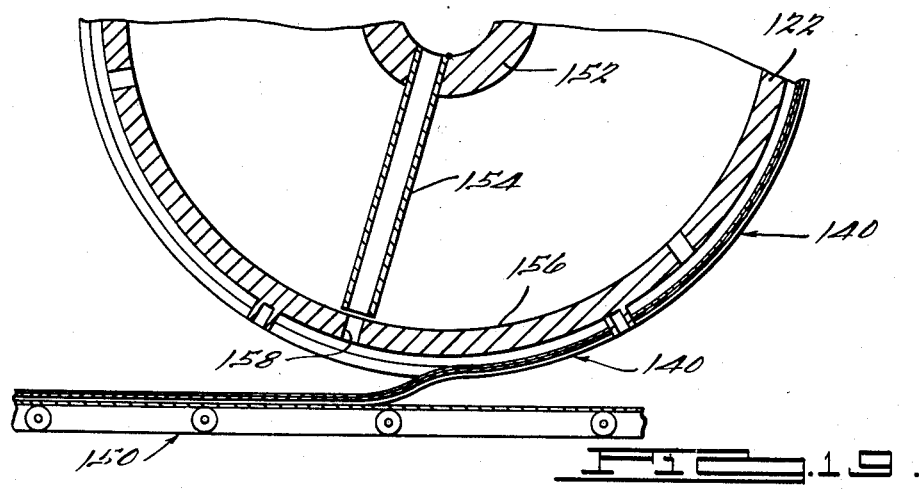
Fig. 19 is an enlarged fragmentary vertical sectional view illustrating removal of a finished glove from the lower cutting roll.

The ejection means for removing the completed gloves from the roll 122 is illustrated in Fig. 19 and may comprise a hollow shaft 152 on which roll 122 is rotatably supported and which is connected to a source of compressed air, and a pipe 154 leading from the hollow shaft 152 to a point closely adjacent the inner periphery 156 of the roll 122. The roll 122 is provided with one or more slots 158 in each of the areas bounded by the cutting ribs 124 and, as such areas pass successively past the pipe 154, the glove carried therein will be ejected by the blast of compressed air from the pipe 154 as the aperture 158 aligns with the pipe. The remainder of the stock, which is scrap material, moves along the table 130 where it may be disposed of in a suitable manner. The blanking rolls 120 and 122 are provided with locating projections 162 and corresponding recesses 164, respectively, for accurately locating the stock as it is blanked out.

Figure 21:
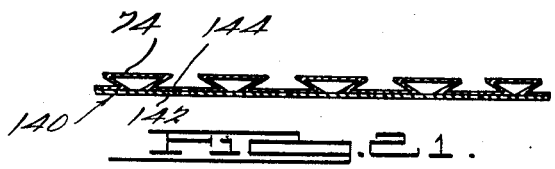
Fig. 21 is a sectional view through the glove taken on line 21—21 of Fig. 20.

As shown in Figs. 20 and 21, a glove 140 made in accordance with the process described consists of a flat palm section 142 and a pleated back 144. The pleats 74 allow expansion or stretching of the glove to accommodate different sized hands. Each of the fingers and the thumb of the glove is provided with a pleat, as shown in Fig. 20. The pleats have been illustrated as having the same width, although it is apparent that the pleats for the several fingers and thumb of the gloves may be made of different widths if desired. For example, the pleat forming the thumb may be made somewhat wider than the remaining pleats by the use of a slightly larger pleating rod and by corresponding changes in the gluing, pressing and cutting rolls.

The gloves thus far described must be made in right- and left-hand patterns. However, the apparatus may be utilized to produce gloves of the kind illustrated in Figs. 22, 23 and 24, which have pleated palms as well as pleated backs so that such gloves may be used for either right or left hand. In making the gloves 170 shown in Fig. 24, the process is essentially the same as that previously described, with the exception that the strip 172 from which the palm of the glove is made would be passed through folding and pleating operations prior to being moved through the pressing station 24. It is not believed necessary to illustrate the pleating of the strip 172 to form this type of glove since the additional apparatus would be substantially a duplicate of the apparatus indicated at 14, 16 and 18 in connection with the strip 10.

Referring to Fig. 22, which illustrates the pressing operation for the modified type of glove, it will be seen that the pressing rolls 106 and 108 are the same as the rolls used to produce the gloves having only the backs thereof pleated. Similarly, the cutting rolls 120 and 122 do not need to be modified in any way to produce the modified type of glove since the areas 139 of the lower cutting roll 122 bounded by the cutting ribs 124 are deep enough to accommodate the pleats 174 of the strip 172 forming the palm of the glove.

Fig. 25 illustrates a further modified type of glove having a flat palm 180 and a pleated back 182 in which the pleats 184 of the back 182 are of different form than those previously described. The glove illustrated in Fig. 25 may be made in accordance with the principles of this invention and in the same manner as the gloves described heretofore. The only change that would be required in the apparatus would be the provision of a different form of pleating mechanism to form pleats of the type indicated at 184 in Fig. 25. It will be apparent that the pleating means might be modified within the scope of this invention to form other types of pleats not illustrated herein.

The stock may be fed through the apparatus in any suitable manner. For example, the cutting rolls 120 and 122 may constitute the driving rolls for the stock or an additional feeding means might be employed. It will also be apparent that the several rolls forming the apparatus may be rotated in synchronized relation in any conventional manner as required.

This application is a continuation-in-part of my copending application Serial No. 720,501 filed March 10, 1958, now abandoned.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. A continuous process for making gloves from elongated strip stock which comprises advancing a first elongated strip of material, progressively forming longitudinally extending corrugations in the form of oppositely disposed loops in said strip of material, progressively forming the loops of the corrugations into longitudinally extending pleats with the opposed edges of adjacent pleats on one side of the strip spaced from each other, applying glue to successive portions of the opposite side of the strip on a pattern corresponding to the outline of a glove except at that portion corresponding to the open end of the glove and with the spaces between the fingers of the pattern aligning with the spaces between said opposed edges of said pleats, advancing a second elongated strip of material in contact with the first strip after the glue is applied thereto and pressing the strips together at the glued portions as they are advanced together, and severing the strips at the glued portions thereof and on a line corresponding to the open end of the glove to sever completed gloves from successive portions of the two strips of material.

2. A process for making gloves from elongated strip stock which comprises advancing a first elongated strip of material, progressively forming longitudinally extending pleats in said strip of material with the opposed edges of adjacent pleats on one side of the strip spaced from each other, applying glue to successive portions of the opposite side of the strip on a pattern corresponding to the outline of a glove except at that portion corresponding to the open end of the glove and with the spaces between the fingers of the pattern aligning with the spaces between said opposed edges of said pleats, advancing a second elongated strip of material in contact with the first strip after the glue is applied thereto, pressing the strips together at the glued portions as they are advanced together, and severing the strips at the glued portions thereof and on a line corresponding to the open end of the glove to sever completed gloves from successive portions of the two strips of material.

3. A continuous process for making gloves from elongated strip stock which comprises advancing two separate elongated strips of material, progressively forming longitudinally extending corrugations in the form of oppositely disposed loops in said strips of material, progressively forming the loops of the corrugations into longitudinally extending pleats with the opposed edges of adjacent pleats on one side of each strip spaced from each other, applying glue to successive portions of the opposite side of one of said strips on a pattern corresponding to the outline of a glove except at that portion corresponding to the open end of the glove and with the spaces between the fingers of the pattern aligning with the spaces between opposed edges of the pleats in said one strip, contacting the glued side of said one strip with the other strip and pressing the strips together at the glued portions as they are advanced together, and severing the strips at the glued portions thereof and on a line corresponding to the open end of the glove to sever completed gloves from successive portions of the two strips of material.

4. A continuous process for making gloves from elongated strip stock which comprises advancing a first elongated strip of material, progressively forming longitudinally extending pleats in said strip of material with the opposed edges of adjacent pleats on one side of the strip spaced from each other, adhering successive portions of said strip to successive portions of a second elongated strip of material on a pattern corresponding to the outline of a glove except at that portion corresponding to the open end of the glove and with the spaces between the fingers of the pattern aligning with the spaces between said opposed edges of said pleats, and severing the strips at the adhered portions thereof and on a line corresponding to the open end of the glove to sever completed gloves from successive portions of the two strips of material.

5. A process for making gloves from elongated strip stock which comprises advancing a first elongated strip of material, progressively forming longitudinally extending folds in said strip of material, progressively forming the folds into longitudinally extending pleats with the opposed edges of adjacent pleats on one side of the strip spaced from each other, applying glue to successive portions of the opposite side of the strip on a pattern corresponding to the outline of a glove except at that portion corresponding to the open end of the glove, advancing a second elongated strip of material in contact with the first strip after the glue is applied thereto, pressing the strips together at the glued portions thereof, and severing the strips at the glued portions and on a line corresponding to the open end of the glove to sever completed gloves from successive portions of the two strips of material.

6. A process for making gloves from elongated strip stock which comprises advancing a first elongated strip of material, progressively forming a plurality of spaced, longitudinally extending pleats in the strip of material, applying glue to successive portions of the opposite side of the strip on a pattern corresponding to the outline of a glove, advancing a second elongated strip of material in contact with the first strip after the glue is applied thereto and pressing the strips together at the glued portions as they are advanced together, and severing the strips at the glued portions thereof and on a line corresponding to the open end of the glove to sever completed gloves from successive portions of the two strips of material.

7. Apparatus for forming longitudinally extending box pleats in an elongated strip of material, comprising a set of parallel corrugating rolls between which the strip is passed, said rolls each being provided with a series of spaced annular discs thereon with the discs on one roll meshed with the discs on the other roll to progressively form longitudinally extending corrugations in the form of oppositely disposed loops in the strip as it passes between said rolls, and a pleat forming device receiving the corrugated strip as it leaves the corrugating rolls, said pleat forming device comprising a series of spaced, parallel substantially coplanar rods, said rods having substantially cylindrical leading ends and being tapered from said leading ends to thin, flat trailing ends having a width greater than the diameter of said leading ends, the trailing ends of alternate rods in the series being spaced slightly from the trailing ends of the rods adjacent thereto in a direction normal to the axis of the rods and overlapping the same, said rods being adapted to receive the loops of the corrugations in said strip of material on the leading ends of said rods and to progressively form the same into pleats as said strip passes over the rods to their trailing ends, and feed means for feeding said strip through said rolls and said pleat forming device.

8. A disposable paper glove comprising a palm section and a back section made from paper material and glued together at their marginal edges except for the opening into the glove, said back section having pleats therein extending in parallel relation throughout the length of the glove with the pleats each having a width substantially equal to the width of one of the fingers of the glove, said pleats consisting of portions of the material folded longitudinally into overlapping relation to form three thicknesses of material to allow expansion of the glove to adapt the glove for different sizes.

9. A disposable glove comprising a palm section and a back section sealed at their marginal edges except for the opening into the glove, said back section having pleats therein extending in parallel relation throughout the length of the glove, said pleats comprising longitudinally folded portions of the glove material to form three thicknesses of material to allow expansion of the back section of the glove to adapt the glove for different sizes.

10. A glove comprising a palm section and a back section sealed at their marginal edges except for the opening into the glove, said sections having pleats therein extending in parallel relation throughout the length of the glove, said pleats each consisting of three thicknesses of the material forming the glove to permit the glove to be pressed flat without destroying the pleats and to allow expansion of the pleats to adapt the glove for different sizes, both said palm and back sections being pleated in the manner described to adapt the glove for use on either hand.

11. Apparatus for making gloves from elongated strip material, comprising a set of opposed corrugating rolls between which a first strip of material is passed to progressively form longitudinally extending corrugations in the form of oppositely disposed loops in the strip as it passes between said rolls, a pleat forming device positioned to receive the corrugated strip as the strip leaves the corrugating rolls, said pleat forming device comprising a series of spaced, parallel substantially coplanar rods, said rods having substantially cylindrical leading ends and being tapered from said leading ends to thin, flat trailing ends having a width greater than the diameter of said leading ends, the trailing ends of alternate rods in the series being spaced from and overlapping the trailing ends of the rods adjacent thereto, said rods being adapted to receive the loops of the corrugations in said strip of material on the leading ends of said rods and to progressively form the same into pleats as said strip passes from the leading to the trailing ends of the rods, a pair of opposed rolls between which the pleated strip is passed for applying glue thereto, one of said pair of rolls having thereon a rib projecting from its periphery and conforming to the outline of a glove and means for applying glue to the ribbed portion of said one roll, whereby the glue is transferred to successive portions of said strip on said outline as the strip on said outline as the strip passes between said rolls, means for contacting a second strip of material with the glued strip for pressing the two strips together at the glued portion thereof, a pair of opposed cutting rolls between which the glued strips are passed and having cutting ribs thereon for severing the strips at the glued portions thereof as the strips pass between said cutting rolls thereby to sever completed gloves from successive portions of the strips, and feed means for advancing said strips through said apparatus.

12. Apparatus for making gloves from elongated strip material, comprising a set of opposed corrugating rolls between which a first strip of material is passed to progressively form longitudinally extending corrugations in the form of oppositely disposed loops in the strip as it passes between said rolls, a pleat forming device through which the corrugated strip is passed to progressively form the corrugations into pleats, a pair of opposed rolls between which the pleated strip is passed for applying adhesive to successive portions of the strip on a pattern conforming to the outline of a glove, means for contacting a second strip of material with the strip for pressing the two strips together to seal the same along said pattern, a pair of opposed cutting rolls having cutting ribs thereon for severing the strips at the adhered portions thereof as the strips pass between said cutting rolls thereby to sever completed gloves from successive portions of the strips, and means for advancing said strips through said apparatus.

13. A disposable paper glove comprising a palm section and a back section sealed at their marginal edges except for the opening into the glove, said back section having pleats therein extending in parallel relation throughout the length of the glove, said pleats consisting of portions of the glove material folded longitudinally into overlapping relation to firm three thicknesses of material, each of the fingers and the thumb of the glove having at least one of said pleats to allow expansion of the glove to adapt the glove for different sizes.

References Cited in the file of this patent

UNITED STATES PATENTS

| | | |
|---|---|---|
| 85,922 | Fuzzard | Jan. 19, 1869 |
| 1,731,340 | Lambert | Oct. 15, 1929 |
| 2,034,609 | Creese et al. | Mar. 17, 1936 |
| 2,094,415 | Schwartz | Sept. 28, 1937 |
| 2,227,391 | Kernal | Dec. 31, 1940 |
| 2,577,284 | Steinle | Dec. 4, 1951 |
| 2,661,476 | Bobbitt | Dec. 8, 1953 |